US008230000B2

(12) United States Patent
Sato et al.

(10) Patent No.: US 8,230,000 B2
(45) Date of Patent: *Jul. 24, 2012

(54) IMAGE-DISPLAY METHOD, PROJECTOR, IMAGE-DISPLAY SYSTEM, PROJECTOR-CONTROL METHOD, IMAGE-DISPLAY PROGRAM, AND PROJECTOR-CONTROL PROGRAM

(75) Inventors: Minoru Sato, Sapporo (JP); Shinji Kubota, Ima (JP); Toru Karasawa, Komiino-Gun (JP)

(73) Assignee: Seiko Epson Corporation, Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 12/493,809

(22) Filed: Jun. 29, 2009

(65) Prior Publication Data
US 2009/0284667 A1 Nov. 19, 2009

Related U.S. Application Data

(63) Continuation of application No. 10/788,356, filed on Mar. 1, 2004, now abandoned.

(30) Foreign Application Priority Data

Mar. 24, 2003 (JP) ................................. 2003-080030

(51) Int. Cl.
*G06F 15/16* (2006.01)
(52) U.S. Cl. ........ 709/202; 709/201; 709/203; 709/204; 709/205
(58) Field of Classification Search .................. 709/201, 709/202, 203, 204, 205
See application file for complete search history.

(56) References Cited

U.S. PATENT DOCUMENTS

| 4,430,526 A | 2/1984 | Brown et al. |
| 4,599,489 A | 7/1986 | Cargile |
| 4,800,590 A | 1/1989 | Vaughan |
| 5,572,193 A | 11/1996 | Flanders et al. |
| 5,758,079 A | 5/1998 | Ludwig et al. |
| 5,768,510 A | 6/1998 | Gish |
| 5,771,352 A | 6/1998 | Nakamura et al. |
| 5,877,747 A | 3/1999 | Kitao et al. |
| 6,141,000 A | 10/2000 | Martin |
| 6,148,406 A | 11/2000 | Weisz |

(Continued)

FOREIGN PATENT DOCUMENTS

EP 1059766 A 13/2000

(Continued)

OTHER PUBLICATIONS

Office Action issued in U.S. Appl. No. 10/228,334 mailed on Jan. 25, 2006.

(Continued)

*Primary Examiner* — Hieu Hoang
(74) *Attorney, Agent, or Firm* — Oliff & Berridge, PLC

(57) ABSTRACT

With a conventional image-display system, a presenter sometimes has difficulty in providing every viewer with an easy-to-see picture. When projecting an image transmitted from a computer operated by the presenter and enabling the viewer to watch the image projected by the projector, the projector receives image data transmitted through two-way communication from the computer operated by the presenter, projects an image represented by the received image data and transmits the received image data to a client computer operated by the viewer through the two-way communication, and the client computer receives the image data transmitted through the two-way communication and displays the image represented by the received image data on its display.

4 Claims, 5 Drawing Sheets

U.S. PATENT DOCUMENTS

| | | | |
|---|---|---|---|
| 6,169,976 | B1 | 1/2001 | Colosso |
| 6,345,294 | B1 | 2/2002 | O'Toole et al. |
| 6,417,933 | B1 | 7/2002 | Szurkowski |
| 6,493,467 | B1 | 12/2002 | Okuda et al. |
| 6,670,603 | B2 | 12/2003 | Shimada et al. |
| 6,735,616 | B1* | 5/2004 | Thompson et al. ............ 709/204 |
| 6,760,749 | B1* | 7/2004 | Dunlap et al. ................. 709/204 |
| 6,783,252 | B1 | 8/2004 | Cambron |
| 6,828,986 | B2 | 12/2004 | Sakashita et al. |
| 6,830,340 | B2 | 12/2004 | Olson et al. |
| 6,904,451 | B1 | 6/2005 | Orfitelli et al. |
| 6,904,526 | B1 | 6/2005 | Hongwei |
| 6,957,232 | B2 | 10/2005 | Hoeye et al. |
| 7,016,935 | B2 | 3/2006 | Lee et al. |
| 7,018,043 | B2 | 3/2006 | Castaldi et al. |
| 7,047,088 | B2 | 5/2006 | Nakamura et al. |
| 7,139,248 | B2 | 11/2006 | Murai et al. |
| 7,191,214 | B2 | 3/2007 | Watanabe |
| 7,254,418 | B2 | 8/2007 | Iwasaki |
| 7,293,071 | B2 | 11/2007 | Sato et al. |
| 7,397,476 | B2 | 7/2008 | Akaiwa et al. |
| 7,403,510 | B1 | 7/2008 | Miyake |
| 7,447,906 | B2 | 11/2008 | Kubota |
| 7,486,254 | B2 | 2/2009 | Suzuki et al. |
| 7,647,555 | B1 | 1/2010 | Wilcox et al. |
| 7,770,210 | B2 | 8/2010 | Kubota |
| 7,782,330 | B2 | 8/2010 | Akaiwa et al. |
| 7,797,430 | B2 | 9/2010 | Ichieda |
| 7,965,284 | B2 | 6/2011 | Akaiwa et al. |
| 2001/0003479 | A1 | 6/2001 | Fujiwara |
| 2001/0017712 | A1 | 8/2001 | Kasatani |
| 2001/0021980 | A1 | 9/2001 | Linden et al. |
| 2002/0015175 | A1* | 2/2002 | Katsuda ....................... 358/1.15 |
| 2002/0026512 | A1* | 2/2002 | Nishimura et al. ........... 709/226 |
| 2002/0036652 | A1* | 3/2002 | Masumoto et al. ........... 345/732 |
| 2002/0083319 | A1 | 6/2002 | Ishiguro et al. |
| 2002/0090912 | A1 | 7/2002 | Cannon et al. |
| 2002/0108108 | A1 | 8/2002 | Akaiwa et al. |
| 2002/0122075 | A1 | 9/2002 | Karasawa et al. |
| 2002/0131078 | A1 | 9/2002 | Tsukinokizawa |
| 2002/0133713 | A1 | 9/2002 | Fieschi et al. |
| 2002/0175915 | A1* | 11/2002 | Lichtfuss ...................... 345/440 |
| 2003/0017846 | A1 | 1/2003 | Estevez et al. |
| 2003/0028637 | A1 | 2/2003 | Gross |
| 2003/0034999 | A1* | 2/2003 | Coughlin et al. ............. 345/738 |
| 2003/0048281 | A1* | 3/2003 | Murai et al. .................. 345/620 |
| 2003/0072429 | A1* | 4/2003 | Slobodin et al. ......... 379/202.01 |
| 2003/0081561 | A1 | 5/2003 | Hsiao |
| 2003/0088793 | A1 | 5/2003 | Parry |
| 2003/0110217 | A1 | 6/2003 | Raju |
| 2003/0115263 | A1* | 6/2003 | Tran et al. ..................... 709/203 |
| 2003/0198347 | A1 | 10/2003 | Ribes et al. |
| 2003/0204716 | A1* | 10/2003 | Rockwood et al. ........... 713/150 |
| 2003/0217293 | A1* | 11/2003 | Lee ................................ 713/202 |
| 2003/0221011 | A1* | 11/2003 | Shitano ......................... 709/229 |
| 2003/0236895 | A1 | 12/2003 | Ohkubo et al. |
| 2004/0051734 | A1* | 3/2004 | Taniguchi et al. ............. 345/743 |
| 2004/0073795 | A1* | 4/2004 | Jablon ........................... 713/171 |
| 2004/0109137 | A1 | 6/2004 | Bubie et al. |
| 2004/0117445 | A9 | 6/2004 | Lee et al. |
| 2004/0119945 | A1 | 6/2004 | Nakamura et al. |
| 2004/0123118 | A1* | 6/2004 | Dahan et al. .................. 713/189 |
| 2004/0130502 | A1 | 7/2004 | Sato et al. |
| 2004/0130568 | A1 | 7/2004 | Nagano et al. |
| 2004/0227900 | A1 | 11/2004 | Sato et al. |
| 2004/0236943 | A1 | 11/2004 | Edwards et al. |
| 2004/0249945 | A1 | 12/2004 | Tabuchi et al. |
| 2005/0033805 | A1 | 2/2005 | Fujiyama et al. |
| 2005/0036509 | A1 | 2/2005 | Acharya et al. |
| 2005/0043973 | A1 | 2/2005 | Childers |
| 2005/0066047 | A1 | 3/2005 | Miyake et al. |
| 2005/0068506 | A1 | 3/2005 | Moriwaki et al. |
| 2005/0071430 | A1 | 3/2005 | Kobayashi et al. |
| 2005/0091359 | A1 | 4/2005 | Soin et al. |
| 2005/0097179 | A1 | 5/2005 | Orme |
| 2005/0102356 | A1 | 5/2005 | Manion et al. |
| 2005/0262223 | A1 | 11/2005 | Kimura |
| 2006/0170875 | A1 | 8/2006 | Falck et al. |
| 2006/0184497 | A1* | 8/2006 | Suzuki et al. ..................... 707/1 |
| 2006/0250585 | A1 | 11/2006 | Anderson et al. |
| 2007/0005809 | A1* | 1/2007 | Kobayashi et al. ........... 709/250 |
| 2007/0286144 | A1 | 12/2007 | Miyake |
| 2008/0234843 | A1 | 9/2008 | Akaiwa et al. |
| 2010/0257586 | A1 | 10/2010 | Kubota |
| 2011/0210977 | A1 | 9/2011 | Akaiwa et al. |

FOREIGN PATENT DOCUMENTS

| | | |
|---|---|---|
| EP | 0 656 581 A1 | 6/1995 |
| EP | 0 737 911 A1 | 10/1996 |
| EP | 0 874 300 A2 | 10/1998 |
| JP | 06-197340 | 7/1994 |
| JP | A-06-197340 | 7/1994 |
| JP | A-07-200215 | 8/1995 |
| JP | A-07-336370 | 12/1995 |
| JP | A-09-503877 | 4/1997 |
| JP | 10-200638 | 7/1998 |
| JP | A-10-200638 | 7/1998 |
| JP | A-10-289106 | 10/1998 |
| JP | A-11-098170 | 4/1999 |
| JP | A-11-319815 | 11/1999 |
| JP | B-3017925 | 12/1999 |
| JP | A-2000-076028 | 3/2000 |
| JP | A-2000-089726 | 3/2000 |
| JP | A-2000-122829 | 4/2000 |
| JP | A-2000-122944 | 4/2000 |
| JP | 2000-165577 | 6/2000 |
| JP | A-2000-165577 | 6/2000 |
| JP | A-2000-222163 | 8/2000 |
| JP | A-2001-092408 | 4/2001 |
| JP | A-2001-103078 | 4/2001 |
| JP | A-2001-144767 | 5/2001 |
| JP | 2001-175602 A | 6/2001 |
| JP | A-2001-202316 | 7/2001 |
| JP | 2001-273259 A | 10/2001 |
| JP | 2001-343959 | 12/2001 |
| JP | 2001-358919 A | 12/2001 |
| JP | A-2001-343959 | 12/2001 |
| JP | 2002-007091 A | 1/2002 |
| JP | A-2002-007350 | 1/2002 |
| JP | A-2002-044096 | 2/2002 |
| JP | A-2002-099473 | 4/2002 |
| JP | 2003-006128 | 1/2003 |
| JP | A-2003-006128 | 1/2003 |
| JP | A-2003-069923 | 3/2003 |
| JP | A-2003-110555 | 4/2003 |
| JP | 2003-173177 | 6/2003 |
| JP | A-2003-173177 | 6/2003 |
| JP | A-2003-256063 | 9/2003 |
| JP | 2003-333559 A | 11/2003 |
| JP | A-2004-062477 | 2/2004 |
| JP | A-2005-084846 | 3/2005 |
| JP | A-2005-099574 | 4/2005 |
| JP | B-4022683 | 10/2007 |
| WO | WO 95-10823 A | 4/1995 |
| WO | WO 99/37055 | 7/1999 |
| WO | WO01-92953 A | 6/2001 |

OTHER PUBLICATIONS

Office Action issued in U.S. Appl. No. 10/228,334 mailed on Jul. 11, 2006.

Office Action issued in U.S. Appl. No. 10/228,334 mailed on Nov. 9, 2006.

Office Action issued in U.S. Appl. No. 10/228,334 mailed on May 2, 2007.

Advisory Action issued in U.S. Appl. No. 10/228,334 mailed on Jul. 18, 2007.

Office Action issued in U.S. Appl. No. 10/228,334 mailed on Dec. 27, 2007.

Examiner's Interview Summary issued in U.S. Appl. No. 10/228,334 mailed on Apr. 8, 2008.

Notice of Allowance issued in U.S. Appl. No. 10/228,334 mailed on Aug. 5, 2008.

Office Action issued in Japanese Patent Application No. 11-360141 mailed on Jul. 6, 2007. (Translation).

Richardson et al., "Virtual Network Computing", IEEE Internet Computing, Vo. 2, No. 1, Jan./Feb. 1998.

Extended European Search Report issued in European Patent Application No. 10177908.0 on Dec. 3, 2010.

Extended European Search Report issued in European Patent Application No. 10177910.6 on Dec. 3, 2010.

Extended European Search Report issued in European Patent Application No. 10177911.4 on Dec. 6, 2010.

Office Action issued in U.S. Appl. No. 12/493,809 mailed on Aug. 31, 2011.

* cited by examiner

IMAGE-DISPLAY METHOD, PROJECTOR, IMAGE-DISPLAY SYSTEM, PROJECTOR-CONTROL METHOD, IMAGE-DISPLAY PROGRAM, AND PROJECTOR-CONTROL PROGRAM

This is a Continuation of application Ser. No. 10/788,356 filed Mar. 1, 2004, which claims the benefit of Japanese Patent Application No. 2003-080030 filed Mar. 24, 2003. The disclosure of the prior application is hereby incorporated by reference herein in its entirety.

BACKGROUND OF THE INVENTION

1. Field of the Invention

This invention relates to an image-display method, a projector, an image-display system, a projector-control method, an image-display program, and a projector-control program.

2. Description of the Related Art

In a conventional image-display system of this type, a presenter connects his/her computer to a projector through a network and sends the data of an image displayed on his/her computer to the projector, which projects the image on a screen (see, for example, Japanese Unexamined Patent Publication No. 2001-14135).

With the above image-display system, the presenter sometimes has difficulty in providing every viewer with an easy-to-see picture. For example, viewers at a distance from the screen in a large presentation hall often have difficulty in watching the screen and concentrating on the content of the presentation, particularly if letters and figures are small.

SUMMARY OF THE INVENTION

In accordance with the above, it is the object of the present invention to provide an image-display method, a projector, an image-display system, a projector-control method, an image-display program, and a projector-control program capable of providing every viewer with an easy-to-see picture.

To achieve the above object, image data transmitted from a computer operated by a presenter are sent to client computers operated by viewers according to the present invention. Because the image data represent images to be projected on a screen by a projector, viewers can watch the images on the displays of client computers on hand by reproducing them with client computers. Accordingly, even if viewers are seated at a distance from the screen in a large hall, they can watch images on the displays of client computers on hand.

Although it serves the purpose if the computer operated by the presenter can transmit image data representing images to be projected on a screen, it is preferable if the computer operated by the presenter is the same as the computer used by the presenter for presentation. In this sense, it is preferable to transmit image data for displaying computer pictures including the presenter's operation (operation of a mouse pointer, etc.). Formats of image data are not limited in particular. Various formats such as picture signals, RGB signals, and compressed data of MPEG etc. can be adopted.

It serves the purpose if the communication-control units of the projector and the client computers can connect the computer operated by the presenter and the client computers that can be operated by the viewers interactively, and communication lines, protocols and standards are not limited. For example, either a wire network or a radio network will do, and various protocols such as TCP and UDP can be adopted, or various standards of Ethernet (a registered trademark of Fuji Xerox Co., Ltd.), IEEE 1394, USB, etc. can be adopted.

It serves the purpose if the unit for projecting images can project images represented by image data on a screen; accordingly, if image data are compressed, the projecting unit decompresses them and projects images on a screen. The image data-transmitting section sends on the above image data received to client computers. If image data are processed (for example, expanded) for the display of images and then sent on to client computers, the image data become bulky and it takes time for the image data-transmitting section to send on the image data to client computers.

Accordingly, it is preferable for the image data-transmitting unit to send on the above image data received, just as they are, to client computers. Besides, because image data are sent on from the projector to client computers, it is unnecessary for the computer operated by the presenter to be involved in the sending on of image data to a plurality of client computers. The load due to the control of communication occurs on the projector alone. Because the computer operated by the presenter is operated in various ways, the presenter can make presentation smoothly even with a low-performance computer if extra loads are eliminated.

It serves the purpose if the image-displaying unit of the client computer is capable of displaying the images represented by image data fed from the projector. If the above image-data processing is made in the projector, it is preferable to do the processing and decompressing, etc. with the same algorithm so that images displayed on the displays of client computers are always the same as images displayed on the screen by the projector. If image data are stored in a hard disk, a RAM, or the like of the client computer, the viewer can review images of the presentation at any time. If a viewer cannot keep up with the presentation, he/she can pause and restart at any time. Thus, such convenient functions can be achieved.

As described above, the projector sends on image data representing projected images to the client computers so that viewers can watch images on the displays of client computers. On the other hand, the presenter may want to disable the client computers from displaying certain images because of the contents of the presentation or presenter's intention. To achieve this selective non-display of image, the computer operated by the presenter sends the projector 30 data indicating the permission or prohibition of the delivery of image data to the client computers, and the image data-transmitting unit of the projector handles image data in accordance with the permission/prohibition-indicating data. With regard to delivery-permitted image data, the projector permits all the client computers, which demanded connection, to connect to itself and sends on the image data to the client computers.

In this manner, the projector acquires permission/prohibition-indicating data from the computer operated by the presenter and handles image data in accordance with the presenter's intention. Thus, by using permission/prohibition-indicating data alone, the projector can determine whether to send on image data to a plurality of client computers or not. It is not necessary to control the delivery or nondelivery of image data to individual client computers. Thus, the delivery or nondelivery of image data to individual client computers can be controlled by very simple processing.

The above delivery/nondelivery control is convenient especially for the handling of image data in a presentation hall. In other words, because many viewers watch images in a presentation hall, it is often nonsense to try to control the delivery and nondelivery of image data to individual client computers. Accordingly, the delivery/nondelivery control where the presenter takes the initiative in controlling delivery and nondelivery is often sufficient.

The transmission of permission/prohibition-indicating data can be made in various ways. The presenter may register the permission and prohibition of delivery of image data with the computer operated by the presenter in advance, and the computer operated by the presenter may automatically transmit permission/prohibition-indicating data to the projector in response to the inquiries from the projector. When the computer operated by the presenter receives an inquiry from the projector, a pop-up menu for instruction of permission or prohibition may be displayed on the display of the computer operated by the presenter.

To control the delivery or nondelivery of image data, passwords to be inputted through client computers may be used. A viewer inputs a password, which is visible to only the viewers of images projected on the screen by the projector, into the image data-receiving unit of his/her client computer. When he/she demands connection to the projector, the password is sent from his/her client computer to the image data-transmitting unit and a password-checkup section determines whether the password is correct or not. If the password is correct, image data are sent on to his/her client computer.

Thus, it is possible to determine whether image data should be sent on to each client computer or not. Besides, because the password is visible to only the viewers of images projected on the screen by the projector, the destinations of image data can be limited to client computers operated by the viewers of images projected on the screen by the projector. Various passwords can be adopted as the password visible to only the viewers of images projected on the screen by the projector. For example, a password may be written in images projected on the screen by the projector. Accordingly, the destinations of image data can be limited to client computers operated by the viewers in the presentation hall. Alternatively, slips printed with a password may be handed over to the viewers at the entrance of the presentation hall.

Needless to say, the above image-display system functions by the method of executing certain steps in time series with projector and client computers; therefore, the image-display system constitutes an invention as an image-display method and an projector-control method. The image-display system may exist by itself or may be incorporated into a device. Thus, the image-display system as an idea of invention is not limited to the above embodiment, but may be embodied in other specific forms. For example, the image-display system may be made of software or may be made of hardware.

In the case of the embodiment of the idea of the invention as software for controlling an image-display system and a projector, there exist programs realizing such functions, of course. The software is image-display and projector-control programs which are executed in the projector and client computers to realize the above functions.

DESCRIPTION OF THE PREFERRED EMBODIMENTS

Figure 1:
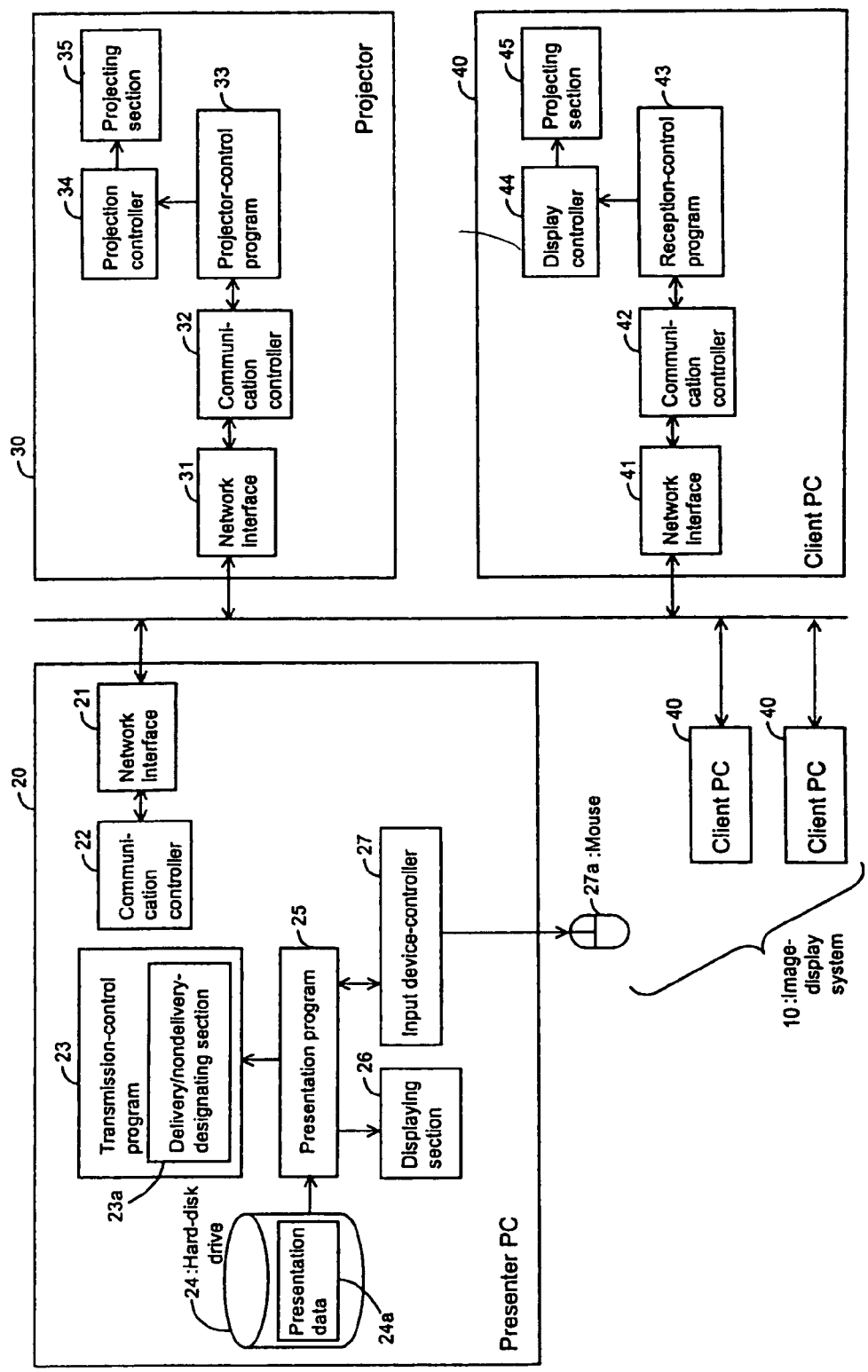
FIG. 1 is a block diagram of an embodiment of the image-display system of the present invention.

The preferred embodiments of the present invention will be described below in the following orders.
(1) Configuration of the image-display system
(2) Processing at the presenter PC
(3) Processing at the projector
(4) Processing at the client PCs
(5) Other embodiments (1) Configuration of the Image-Display System FIG. 1 shows a configuration of the image-display system of the present invention. The image-display system 10 comprises a presenter PC 20, a projector 30, and a plurality of client PCs 40. The presenter PC 20, projector 30, and client PCs 40 form a LAN through UTP cables and can communicate with one another. The projector 30 receives image data from the presenter PC 20 and projects images on a screen. At the same time, the projector 30 sends on the received image data as they are to the client PCs 40 if the image data are delivery-permitted ones. Thus, the client PCs 40 receive image data from the projector 30 and display images on their displays.

The presenter PC 20, projector 30, and client PCs 40 communicate with one another by using the TCP protocol. They send and receive packets to and from one another to establish connection among them, and image data are divided into packets for transmission as the need arises. There are block diagrams in FIG. 1 showing the configurations of a presenter PC 20, a projector 30, and only one client PC 40, but a plurality of client PCs 40 can be realized by using the same configuration.

General-purpose computers can be adopted as a presenter PC 20 and client PCs 40 which control certain interfaces and recording media under certain operating systems. The presenter PC 20 of the image-display system 10 of the present invention comprises a network interface 21, a communication controller 22, a transmission-control program 23, a hard-disk drive 24, a presentation program 25, a displaying section 26, and an input device-controller 27.

To make presentation by using the projector 30, a presenter operates the presenter PC 20 and starts the presentation program 25. The presentation program 25 reads out presentation data 24a, which are prepared and stored in the hard-disk drive 24 in advance, and outputs image data to the displaying section 26 to display images in certain or any order.

The displaying section 26 controls a display such as a liquid-crystal display (not shown in FIG. 1). A mouse 27a or the like inputs operation into the input device-controller 27, which outputs data representing the contents of inputted operation to the presentation program 25, which makes processing such as changing the presentation picture and moving the mouse pointer on the displaying section 26.

While the presentation program 25 is running, the transmission-control program 23 is started and controls the transmission of the image data representing the images on the presentation picture of the displaying section 26 to the projector 30 in order to make the projector 30 project images on a screen which are the same as the images on the presentation picture of the displaying section 26. Besides, the presenter PC 20 is capable of achieving two-way communication by means of the network interface 21 and the communication controller 22. In other words, the communication controller 22 divides image dada fed from the transmission-control program 23 into packets as the need arises, makes such processing as adding data indicating proper destinations, and outputs the image data through the network interface 21. Before being transmitted, image data may be compressed for a higher communication speed or encoded for security.

The transmission-control program 23 has a delivery/non-delivery-designating section 23a. The displaying section 26 and the input device-controller 27 constitute a user interface (not shown) under the control by the delivery/nondelivery-designating unit 23a. Thus, the presenter can designate the delivery and nondelivery of image data to the client PCs 40. The data representing the contents of designation of delivery and nondelivery are stored in the hard-disk drive 24 and can be referred to at any step. At the time of establishing the communication with the projector 30 or at other times, a pop-up menu may be displayed on the user interface so that the presenter can designate delivery or nondelivery of image data to the client PCs 40. And other various configurations for designation of delivery and nondelivery of image data are possible.

In the projector 30, certain interface, recording medium, etc. can be controlled under an operating system and a certain program can be run. To construct the image-display system 10, the projector 30 comprises a network interface 31, a communication controller 32, a projector-control program 33, a projection controller 34, and a projecting section 35. The projector 30 is capable of two-way communication by means of the network interface 31 and the communication controller 32. The communication controller 32 receives packets of image data through the network interface 31, combines the packets in accordance with their headers, and sends the combined image data to the projector-control program 33. Besides, the communication controller 32 receives image data from the projector-control program 33, divides the image data into packets as the need arises, makes such processing as adding data including proper destinations and outputs the packets through the network interface 31.

The projector-control program 33 sends and receives image data and controls the projection of images according to the received image data. Besides, the projector-control program 33 finds whether the image data received are delivery-permitted ones or delivery-prohibited ones and controls two-way communication with the client PCs 40. Moreover, when projecting images, the projector-control program 33 starts the projection controller 34 and sends image data to it. The projection controller 34 processes the received image data and controls the projection of images at the projecting section 35.

Thus, the projection controller 34 processes the above image data received and produces data which are fed to the projecting section 35 for the projection of images on a screen. If image data are compressed or encoded, the projection controller 34 decompresses or decodes the image data. The projecting section 35 has a mechanism to project light of three colors RGB on an external screen through a lens (not shown in FIG. 1) to form images. Thus, the projecting section 35 generates RGB light for individual pixels to form images on the screen by using the above image data processed by the projection controller 34.

In each client PC 40, certain interface, recording medium, etc. can be controlled under an operating system and a certain program can be run. To construct the image-display system of the present invention, each client PC 40 comprises a network interface 41, a communication controller 42, a reception-control program 43, a display controller 44, and a displaying section 45. Each client PC 40 is capable of two-way communication by means of the network interface 41 and the communication controller 42. The communication controller 42 receives packets through the network interface 41, combines the packets in accordance with their headers, and sends the combined image data to the reception-control program 43.

The reception-control program 43 receives and sends image data and controls the display of images according to the received image data. To receive image data, the reception-control program 43 controls two-way communication with the projector 30. The reception-control program 43 starts the display controller 44 and sends the image data to it. The display controller 44 processes the image data and controls the display of images at the displaying section 45. Thus, the display controller 44 processes the above image data received and produces data to be sent to the displaying unit 45 for the display of images. The displaying section 45 has a display such as a liquid-crystal display (not shown in FIG. 1) and generates RGB light for individual pixels to form images on the display.

The processing at the display controller 44 is equivalent to the processing at the projection controller 34. If image data are compressed or encoded, the display controller 44 decompresses or decodes the image data by using the same algorithm as the projection controller 34. Because the projector 30 projects images on a screen while the client PC 40 displays images on a display, the projection controller 34's method of driving the relevant parts for the projection of images is different from the display controller 44's method of driving the relevant parts for the display of images. In this embodiment, however, the projection controller 34 and the display controller 44 have a common point in that an image is expressed by pixels of RGB colors. Thus, the method of processing image data is common to the two controllers 34 and 44. Therefore, the projector 30 and the client PCs 40 have many common modules and hence the image-display system 10 of the present invention can be constructed easily.

(2) Processing at the Presenter PC

Figure 2:
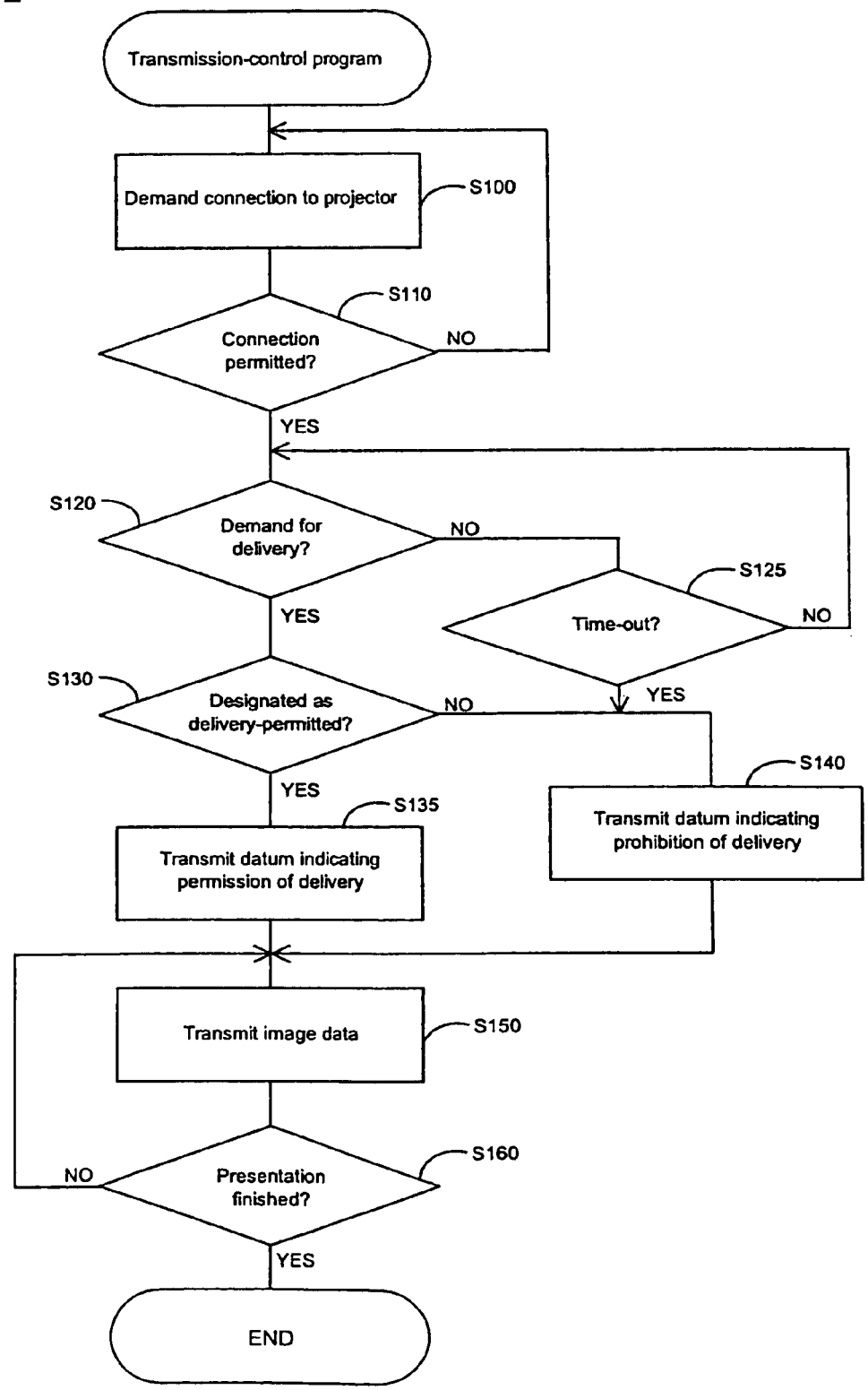
FIG. 2 is a flowchart of the processing by the transmission-control program of the image-display system of FIG. 1.

The processing and workings of the presenter PC 20 are now described. FIG. 2 is a flowchart of the processing of the transmission-control program 23 of the presenter PC 20. In this embodiment, the presenter PC 20 communicates with the projector 30 and does not communicate with the client PCs 40. In Step S100, the transmission-control program 23 demands connection to the projector 30 of the communication controller 22. The communication controller 22 transmits a connection-demanding packet to the projector 30 through the network interface 21. In Step S110, the transmission-control program 23 monitors the network interface 21 through the communication controller 22 for a connection-permitting packet from the projector 30.

When the communication controller 22 receives a connection-permitting packet from the projector 30, the transmission-control program 23 recognizes the permission in Step S110 and monitors the network interface 21 further through the communication controller 22 to find whether there is a demand for the delivery of image data or not in Step S120. In other words, the transmission-control program 23 monitors the network interface 21 for a delivery-demanding packet from the projector 30. If a demand for the delivery of image data is not found in Step S120, the transmission-control program 23 checks to see if a preset time has passed in Step S125. The transmission-control program 23 repeats the processing in and after Step S120 until the preset time passes.

If the preset time has passed without receiving a delivery-demanding packet in Step S125, the delivery/nondelivery-designating section 23a designates image data as delivery-prohibited data and makes the communication controller 22 transmit a datum indicating the prohibition of delivery to the projector 30 in Step S140. If delivery of image data is demanded in Step S120, the delivery/nondelivery-designating section 23a checks in Step S130 to see if the delivery is already permitted. If it is found in Step 130 that the delivery is not permitted, the delivery/nondelivery-designating section 23a makes the communication controller 22 transmit a datum indicating the prohibition of delivery to the projector 30 in Step S140.

If it is found in Step S130 that the delivery is permitted, the delivery/nondelivery-designating unit 23a makes the communication controller 22 transmit a datum indicating the permission of delivery to the projector 30 in Step S135. In Step 150, the image data representing a presentation image displayed on the displaying section 26 under the control by the presentation program 25 are transmitted to the projector 30. Before the transmission, the image data are compressed or encoded as the need arises. In Step S160, the transmission-control program 23 checks to see if the presentation has been finished. The processing in and after Step S150 is repeated until the presentation is finished.

By the processing described above, image data representing the presentation images to be projected by the projector 30 are outputted from the presenter PC 20. Besides, the presenter PC 20 designates image data as ones to be delivered from the projector 30 to the client PCs 40 and ones not to be delivered from the projector 30 to the client PCs 40 and transmits data indicating the contents of the designation to the projector 30. It serves the purpose if the data indicating the contents of designation are transmitted to the projector 30 only once. Thus, the substantial communication load on the system is only the image data-transmission load. Accordingly, when the presenter makes presentation, operating the presenter PC 20, the resource of the presenter PC 20 is prevented from being reduced and hence the presenter can make presentation very smoothly.

(3) Processing at the Projector

Figure 3:
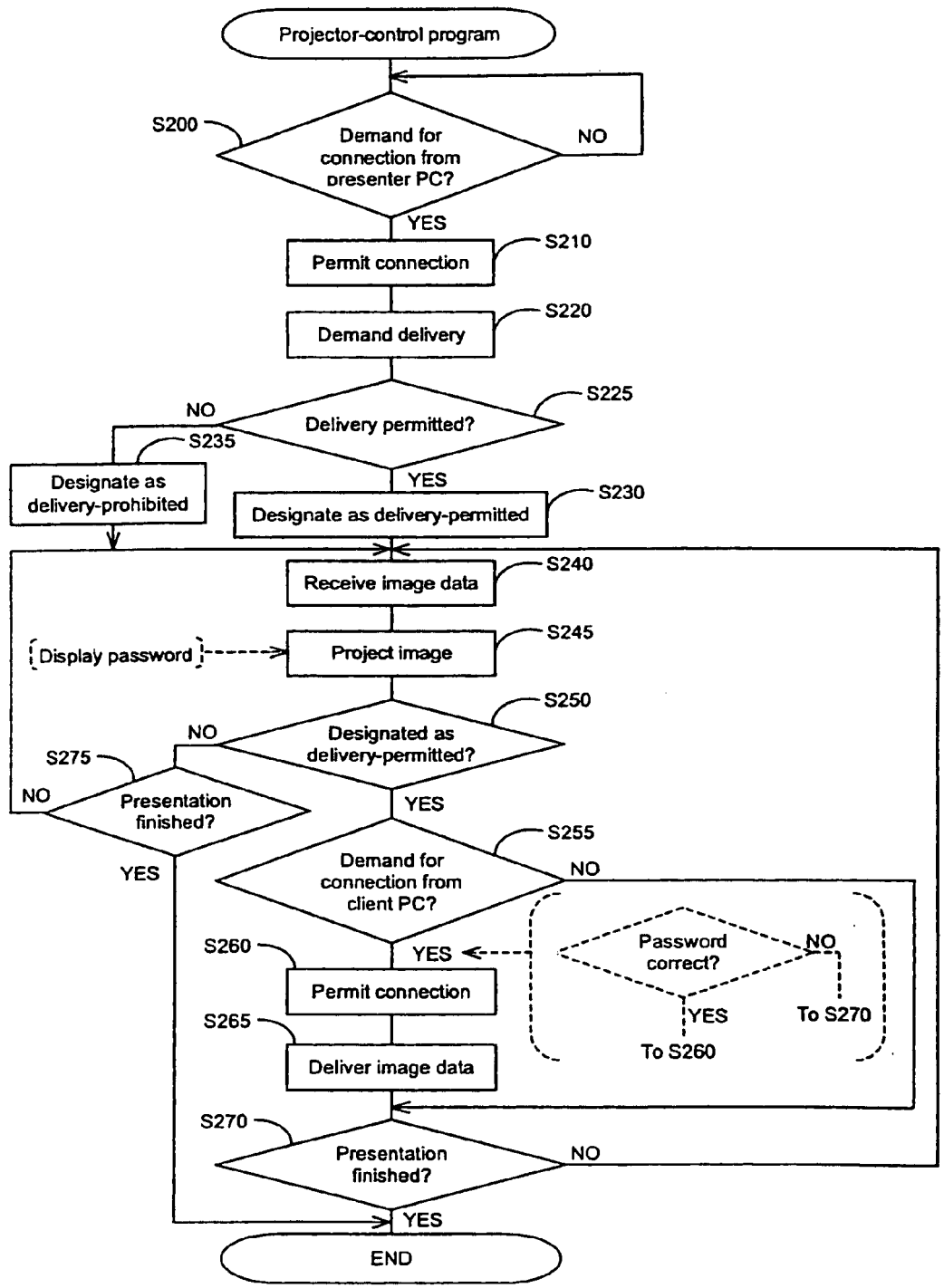
FIG. 3 is a flowchart of the processing by the projector-control program of the image-display system of FIG. 1.

FIG. 3 is a flowchart of the processing of the projector-control program 33 of the projector 30. In this embodiment, the projector 30 makes two-way communication with the presenter PC 20 and the client PCs 40. In Step S200, the projector-control program 33 checks to see if the network interface 31 has received a demand for connection through the communication controller 32. In other words, the projector-control program 33 monitors the network interface 31 through the communication controller 32 for a connection-demanding packet to be outputted by the presenter PC 20 in Step S100.

If the reception of a connection-demanding packet was confirmed in Step S200, the projector-control program 33 makes the communication controller 32 transmit a connection-permitting packet through the network interface 31 to the presenter PC 20 in Step S210. In Step S220, the projector-control program 33 makes the communication controller 32 transmit a delivery-demanding packet through the network interface 31 to the presenter PC 20 in order to check to see if the delivery of image data to the client PCs 40 is permitted.

The presenter PC 20 recognizes the demand of delivery in Step S120 and transmits a datum indicating the permission of delivery in Step S135 or a datum indicating the prohibition of delivery in Step S140 to the projector 30. The projector 30 monitors the network interface 31 through the communication controller 32 for a datum indicating the permission or prohibition of delivery in Step S225. If the projector-control program 33 finds in Step S225 that the delivery of image data to the client PCs 40 is permitted, the projector-control program 33 designates image data as delivery-permitted ones in Step S230. If the projector-control program 33 finds in Step S225 that the delivery of image data to the client PCs 40 is prohibited, the projector-control program 33 designates image data as delivery-prohibited ones in Step S235. Various configurations can be adopted for the designation. For example, flags indicating the permission and prohibition of delivery may be stored in a RAM (not shown in FIG. 1).

When image data has been designated as delivery-permitted or delivery-prohibited ones, the projector-control program 33 makes the communication controller 32 monitor the network interface 31, receive the image data representing a presentation image, and store the image data temporarily in a RAM (not shown in FIG. 1) in Step S240. In other words, the projector-control program 33 makes the communication controller 32 receive packets of image data, combine the packets, and store the combined image data in a RAM. In Step S245, the received image data are sent to the projection controller 34 for the projection of the presentation image. In other words, the projection controller 34 processes (decompresses or decodes as the need arises) the compressed or encoded image data temporarily stored in the RAM to produce data which the projecting section 35 uses to project the presentation image.

In Step S250, the projector-control program 33 checks to see whether image data are designated as delivery-permitted ones (in Step S230) or not (in Step S235). If it is confirmed in Step S250 that image data are designated as delivery-permitted ones, the projector-control program 33 monitors the network interface 31 through the communication controller 32 for connection-demanding packets from client PCs 40 in Step S255. If it is confirmed in Step S255 that some client PCs 40 have sent connection-demanding packets to the projector 30, the projector-control program 33 permits the connection-demanding client PCs 40 to connect with the projector 30 in Step S260. In other words, the projector-control program 33 makes the communication controller 32 transmit a packet indicating the permission of connection to the connection-demanding client PCs 40 through the network interface 31.

In Step S265, the projector-control program 33 sends the image data temporarily stored in the RAM to the connection-permitted client PCs 40. In other words, the projector-control program 33 makes the communication controller 32 (i) divide the image data into packets, (ii) write data, which address the packets to the connection-permitted client PCs 40, into the headers of packets, and (iii) transmit the packets through the network interface 31 to the connection-permitted client PCs 40. The image data sent to the connection-permitted client PCs 40 are the same as the image data stored in the above RAM. In other words, the image data stored in the RAM are transmitted, just as they are, without undergoing the processing by the projection controller 34, to the connection-permitted client PCs 40; therefore, if the image data stored in the RAM is compressed, the image data can be transmitted as a relatively light load on the network.

If the image data were transmitted to the connection-permitted client PCs 40 in Step S265 or any client PCs 40 did not send connection-demanding packets to the projector 30 in Step S255, the projector-control program 33 checks in Step S270 to see if the presentation has been finished. In other words, the projector-control program 33 makes the communication controller 32 monitor the network interface 31 and finds whether the final presentation image has been received or not. The processing in and after Step S240 is repeated until the ending of the presentation is confirmed in Step S270. If image data were designated as delivery-prohibited ones in Step S250, the projector-control program 33 checks in Step S275 to see if the presentation has been finished. If the ending of the presentation is not confirmed in Step S275, the processing in and after Step S240 is made.

As described above, the projector 30 not only receives image data from the presenter PC 20 and projects images on a screen but also sends on image data to connection-permitted client PCs 40 if image data are designated as delivery-permitted ones. Because the projector 30 communicates with the client PCs 40 and sends image data to the client PCs 40, the load on the presenter PC 20 is very light. Besides, because the projector 30 receives image data from the presenter PC 20 and sends on the image data just as they are to the client PCs 40, no load of image processing occurs on the projector 30 and image data are smoothly sent to the client PCs 40 where the viewers can watch images clearly.

RGB cables, coaxial cables, etc. are known as technologies used for the transmission of image data. To transmit image data by using these technologies for the projection of images by the projector 30, two lines are needed; i.e., one line of, for example, RGB for the transmission of image data and another line for two-way communication for the control of the relevant devices. In the present embodiment of this invention, however, it serves the purpose if a cable network is formed among the presenter PC 20, the projector 30 and the client PCs 40. Thus, the image-display system 10 can be constructed with relatively simple construction.

(4) Processing at the Client PC

Figure 4:
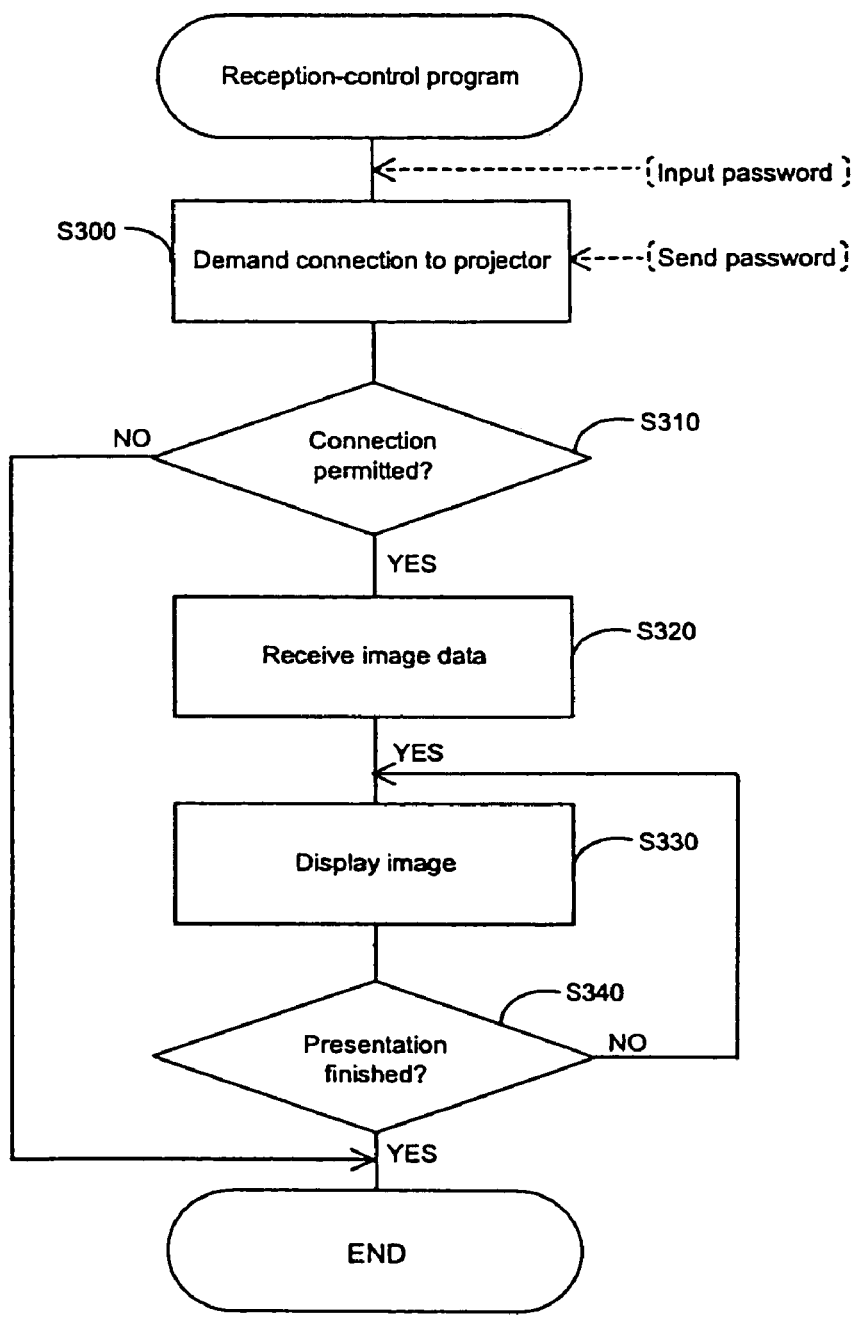
FIG. 4 is a flowchart of the processing by the reception-control program of the image-display system of FIG. 1.

FIG. 4 is a flowchart of the processing of the reception-control program 43 of the client PCs 40. The client PCs 40 communicate with the projector 30 and not with the presenter PC 20. In Step S300, the reception-control program 43 sends a demand for connection to the projector 30 through the communication controller 42. In other words, the reception-control program 43 makes the communication controller 42 send a packet indicating a demand for connection to the projector 30 through the network interface 41.

In Step 310, the reception-control program 43 finds if the connection is permitted. In other words, the reception-control program 43 monitors the network interface 41 through the communication controller 42 to find if a connection-permitting packet to be transmitted by the projector 30 in Step S260 has been received. If the reception-control program 43 finds in Step S310 that the connection is permitted, the reception-control program 43 receives image data outputted by the projector 30 in Step S320. In other words, the reception-control program 43 makes the communication controller 42 (i) monitor the network interface 41, (ii) receive the packets of image data representing a presentation image, (iii) combine the packets into the original image data, and (iv) store the image data in a RAM (not shown in FIG. 1) temporarily.

In Step S340, the reception-control program 43 sends the image data to the display controller 44 for the display of the presentation image on the display. In other words, the display controller 44 processes (decompresses or decodes as the need arises) the decompressed or encoded image data to produce data which the displaying section 45 uses to display the presentation image. Then, in Step S340, the reception-control program 43 makes the communication controller 42 monitor the network interface 41 to find if the final presentation image has been received. Thus, the processing in and after step S320 is repeated until the ending of the presentation is confirmed.

If the reception-control program 43 does not find in Step S310 that the connection is permitted, the processing in and after Step 320 is skipped and image data are not received. As described above, the client PC 40 receives image data from the projector 30 and displays the presentation image on its display. Accordingly, even if viewers are seated at a distance from the screen in a large hall, they can watch images on the display of client computers on hand.

(5) Other Embodiments

The embodiment described above is an example to achieve the image-display system, projector, image-display method, projector-control method, image-display program and projector-control program of the present invention, and other configurations are also possible. For example, the destinations of image data may be limited to client PCs 40 operated by the participants, or viewers, in the presentation hall. For example, the projector permits all the client PCs 40, which demanded connection, to connect to itself and sends on the image data to them. However, passwords to be inputted through client computers may be used to control the delivery of image data.

Figure 5:
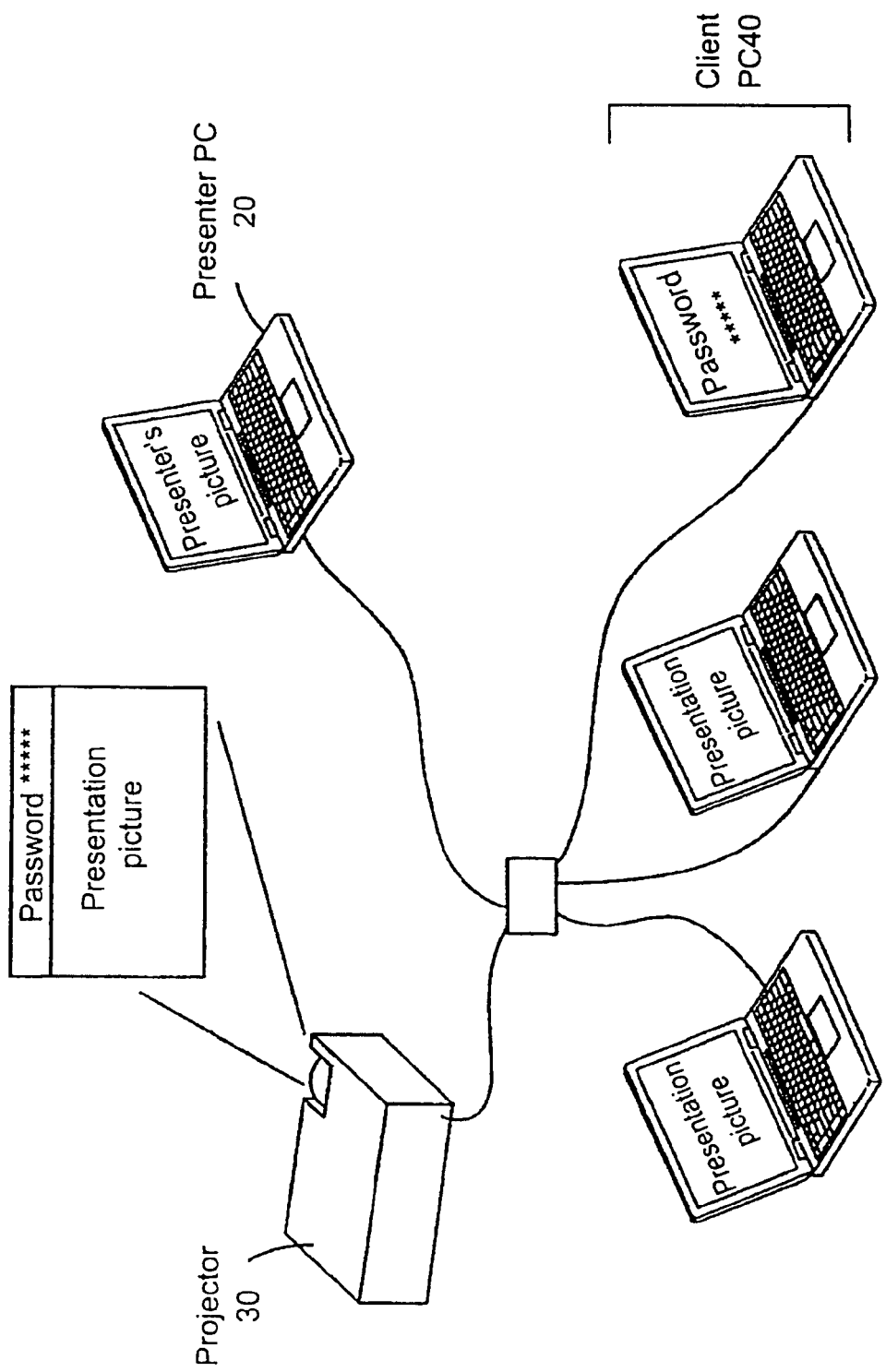
FIG. 5 is a schematic illustration of another embodiment of image-display system of the present invention.

The descriptions surrounded by broken lines in FIGS. 3 and 4 show the processing to be added when the passwords are used to control the delivery of image data, and FIG. 5 is a schematic diagram showing workings of such an example. In this example, as shown in FIG. 5 as an image projected on the screen by the projector 30, a password is displayed in a part of the presentation image. Therefore, the image data sent from the presenter PC 20 are data including an image for displaying the password, and the projector 30 displays the password when projecting the image on the screen in Step S245.

At the client PC 40, the password is inputted by an input device such as a keyboard before sending a demand for connection in Step S300. When sending the demand for connection in Step S300, together with data indicating the demand for connection, data indicating the password is sent. Before giving permission to the connection-demanding client PC 40 in Step S260, the projector 30 acquires the inputted data indicating the password and determines whether the password is correct or not. When it is found that the password is correct, the demand for connection is permitted in Step S260. When it is found that the password is not correct, the processing in Step S270 is carried out.

There are various ways to determine whether the password is correct or not. For example, data indicating the correct password may be stored in advance temporarily in a RAM, etc. (not shown) of the projector 30 and the inputted password may be compared with the stored correct password. Further, the data of the password included in the image data received in the above Step S240 may be extracted and used as the correct password, and various other ways are also possible. Either of the above configurations enables viewers of the image projected on the screen in the presentation hall to input the correct passwords, so that the destinations of image data can be limited to client PCs 40 in the presentation hall.

What is claimed is:
1. An image projection system comprising:
  a projector including:
    a memory that stores image data and a first password of a presentation;
    a projection controller including a projection section of the projector, the projection controller controls the projection section to visibly project onto a screen a first image produced by combining a password image with a second image, the password image being an image of the first password to be input to a computer, the second image corresponding to the image data of the presentation;

a first communication control unit including a first network interface of the projector, the first communication control unit communicates with the computer via a network; and a projector-control program that determines whether a second password received from the computer matches the first password; and the computer including:

a second communication control unit including a second network interface of the computer, the second communication control unit communicates with the projector via the network;

a display unit; and an input device;

wherein the second communication control unit of the computer sends the second password inputted by the input device to the projector;

wherein, if the projector-control program determines that the second password sent from the computer matches the first password stored in the memory, the first communication control unit of the projector transmits the image data to the computer, wherein the second communication control unit of the computer receives the transmitted image data from the projector and the display unit of the computer displays the second image corresponding to the transmitted image data.

2. The image projection system of claim 1, wherein the image data is designated as delivery-permitted data for delivery to the computer or as delivery-prohibited data for withholding from and not delivering to the computer, and wherein the projector-control program further checks that the image data is the delivery-designated data before the first communication control unit of the projector transmits the image data to the computer.

3. A network projector for use with a computer connected to the projector via a network, the projector comprising:

a memory that stores image data and a first password of a presentation;

a projection controller including a projection section of the projector, the projection controller controls the projection section to visibly project onto a screen a first image produced by combining a password image with a second image, the password image being an image of the first password to be input to the computer, the second image corresponding to the image data of the presentation;

a first communication control unit including a first network interface of the projector, the first communication control unit communicates with the computer via a network; and a projector-control program that determines whether a second password received from the computer matches the first password; and wherein, if the projector-control program determines that the second password received from the computer matches the first password stored in the memory, the first communication control unit of the projector transmits the image data to the computer.

4. The network projector of claim 3, wherein the image data is designated as delivery-permitted data for delivery to the computer or as delivery-prohibited data for withholding from and not delivering to the computer, and wherein the projector control program further checks that the image data is the delivery-designated data before the first communication control unit of the projector transmits the image data to the computer.

* * * * *